(12) United States Patent
Kim

(10) Patent No.: US 10,735,095 B1
(45) Date of Patent: Aug. 4, 2020

(54) DISTRIBUTED ANTENNA SYSTEM FOR MASSIVE MIMO SIGNALS WITH ONE FIBER OPTIC CABLE

(71) Applicant: ADVANCED RF TECHNOLOGIES, INC., Burbank, CA (US)

(72) Inventor: Dae Woong Kim, Burbank, CA (US)

(73) Assignee: Advanced RF Technologies, Inc., Burbank, CA (US)

( * ) Notice: Subject to any disclaimer, the term of this patent is extended or adjusted under 35 U.S.C. 154(b) by 0 days.

(21) Appl. No.: 16/440,505

(22) Filed: Jun. 13, 2019

Related U.S. Application Data

(60) Provisional application No. 62/813,364, filed on Mar. 4, 2019.

(51) Int. Cl.
| | |
|---|---|
| *H04B 10/2575* | (2013.01) |
| *H04L 5/00* | (2006.01) |
| *H04L 5/14* | (2006.01) |
| *H04B 7/0413* | (2017.01) |

(52) U.S. Cl.
CPC ..... *H04B 10/25752* (2013.01); *H04B 7/0413* (2013.01); *H04L 5/0051* (2013.01); *H04L 5/1469* (2013.01)

(58) Field of Classification Search
CPC .............. H04B 1/0096; H04B 7/0413; H04B 10/25753; H04B 10/25758; H04B 10/29; H04B 10/564; H04B 10/80; H04W 88/085; H04W 16/26; H04W 24/02; H04W 4/029; H04W 52/0206; H04W 52/245; H04W 52/285; H04W 72/04; H04W 72/0453

USPC ................................................... 398/115–117
See application file for complete search history.

(56) References Cited

U.S. PATENT DOCUMENTS

| | | | |
|---|---|---|---|
| 9,184,960 B1* | 11/2015 | Harel ................. | H04L 25/03006 |
| 2008/0192855 A1* | 8/2008 | Shapira .................... | G01S 3/023 |
| | | | 375/267 |
| 2009/0316608 A1* | 12/2009 | Singh ................. | H04B 7/15507 |
| | | | 370/280 |
| 2011/0249831 A1* | 10/2011 | Bellamy ............... | H04B 7/0874 |
| | | | 381/94.1 |
| 2013/0195467 A1* | 8/2013 | Schmid ................ | H04B 1/0096 |
| | | | 398/115 |
| 2018/0086673 A1* | 3/2018 | Hill ........................ | C04B 35/499 |
| 2019/0052234 A1* | 2/2019 | Braun .................. | H04B 1/0475 |
| 2019/0349159 A1* | 11/2019 | Nammi ................. | H04L 1/0071 |

* cited by examiner

*Primary Examiner* — Amritbir K Sandhu
(74) *Attorney, Agent, or Firm* — Lewis Roca Rothgerber Christie LLP

(57) ABSTRACT

An integrated antenna distributed system incorporates various types of communication signals, such as mobile communication signals, public safety signals, WiFi signals, and other types of communication signals. Such a system uses a single reference signal to support MIMO and Massive MIMO functions using a single optical cable or a single fiber optic cable, and a signal from a remote location. The reference signal is used for frequency stability of remote units (RUs) connected to the head end (HE). For example, a reference signal is selected and sent from the HE to RUs, a bandwidth and frequency conversion of signals to be transmitted is specified and/or performed, a RU receives the converted signals and the reference signal from the HE, where the converted signals may be frequency or band-constrained, and the converted signals are converted at the RUs back to their original frequencies or bands.

14 Claims, 11 Drawing Sheets

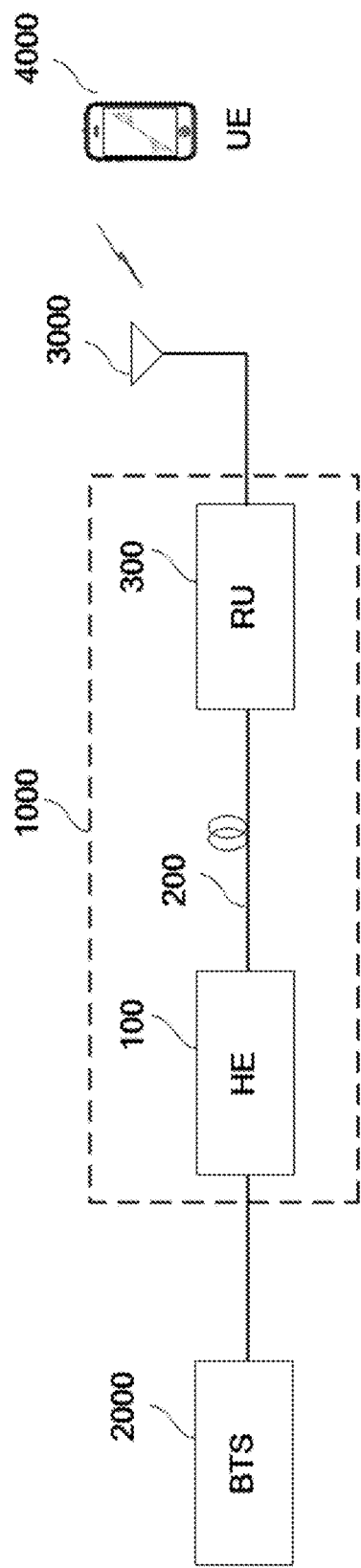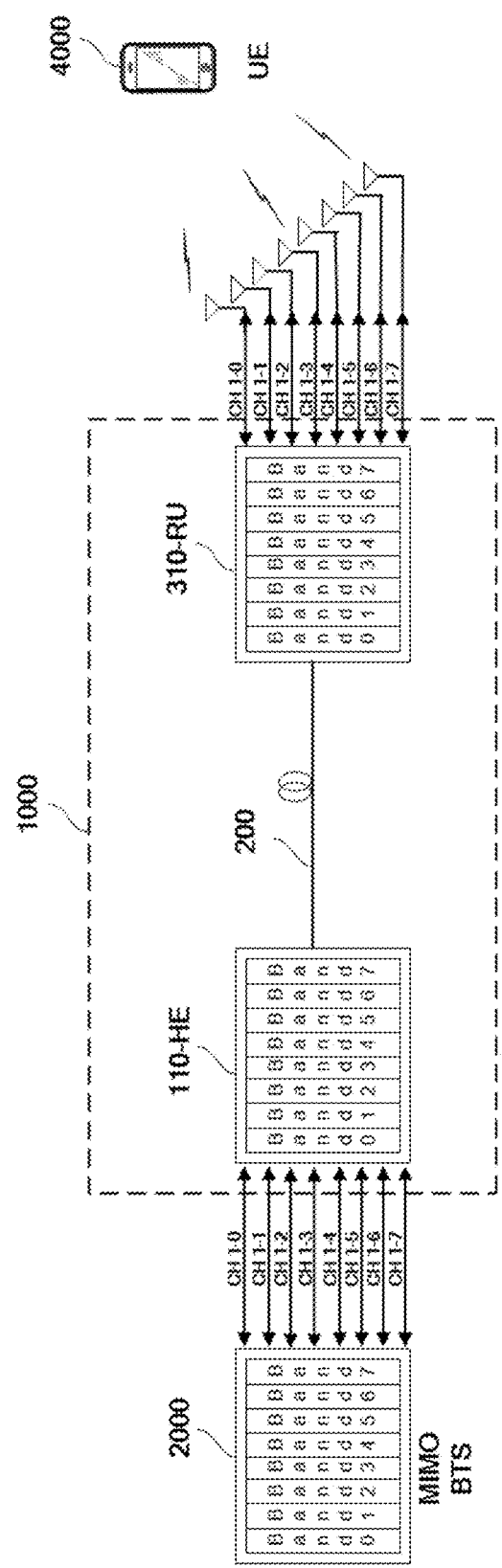
FIG. 1
FIG. 2

| Frequency band | | | Frequency (MHz) | | Remarks |
|---|---|---|---|---|---|
| | | | Start | Stop | |
| Band 600MHz | | Downlink | 617 | 652 | |
| | | Uplink | 663 | 698 | |
| Commercial 700MHz | Lower A+B+C | Downlink | 728 | 746 | - DL : Lower A + B + C + Upper C : 728 - 757 MHz<br>- UL :Lower A + B + C : 698 - 716 MHz, UL Upper C : 776 - 787MHz |
| | | Uplink | 698 | 716 | |
| | Upper C | Downlink | 746 | 757 | |
| | | Uplink | 776 | 787 | |
| Public Safety 700MHz | Band 14 | Downlink | 758 | 768 | FirstNet + Public Safety 700 |
| | | Uplink | 788 | 798 | |
| | PS 700 | Downlink | 763 | 775 | |
| | | Uplink | 793 | 805 | |
| Public Safety 800MHz | | Downlink | 851 | 862 | |
| | | Uplink | 806 | 817 | |
| Commercial SMR 800MHz+Band 850MHz | | Downlink | 862 | 894 | 3GPP operating band 5 + Cellular |
| | | Uplink | 817 | 849 | |
| Public Safety SMR 900MHz | | Downlink | 935 | 940 | |
| | | Uplink | 896 | 901 | |
| Band 1900MHz (PCS) | | Downlink | 1930 | 1995 | 3GPP operating band 2, PCS |
| | | Uplink | 1850 | 1915 | |
| Band 2100MHz (AWS) | | Downlink | 2110 | 2180 | 3GPP operating band 1, AWS<br>3GPP operating band 3, AWS |
| | | Uplink | 1710 | 1780 | |
| Band 2300MHz (WCS) | | Downlink | 2350 | 2360 | |
| | | Uplink | 2305 | 2315 | |
| Band 2600MHz (BRS, FDD) | | Downlink | 2620 | 2690 | 3GPP operating band 7, BRS |
| | | Uplink | 2500 | 2570 | |
| Band 2500MHz (BRS, TDD) | | | 2496 | 2690 | 3GPP operating band 41, BRS |
| Band 3.5GHz (CBRS, TDD) | | | 3550 | 3700 | |

FIG. 13

DISTRIBUTED ANTENNA SYSTEM FOR MASSIVE MIMO SIGNALS WITH ONE FIBER OPTIC CABLE

CROSS-REFERENCE TO RELATED APPLICATION

The present application claims priority to and the benefit of U.S. Provisional Patent Application No. 62/813,364, filed Mar. 4, 2019, the contents of which are hereby incorporated by reference in their entirety.

BACKGROUND

Field

Embodiments of the present invention relate generally to utilizing a single optical cable to transmit multiple radio frequency (RF) signals simultaneously to a wide range of RF signals, to realize multi-band or Massive MIMO, for communication signals and distributed Antenna System (DAS) systems for communication signal broadcasting. More specifically, embodiments of the invention relate to integrating signals from different types of radio frequencies, and using a Hybrid Fiber Coaxial (HFC) cable to generate a large number of I/O antenna distributed systems and large numbers of I/O antennas distributed to interior and exterior areas of buildings.

Description of Related Art

Mobile communications continue to develop, where improved mobile communication infrastructures coexist with diverse types of mobile communication networks, and are provided with second generation, third generation, and fourth generation services. Multi-Band Multi-Mode systems are generally required to support and connect these various kinds of networks. These multi-band multi-mode systems have a need to cover all of the communication networks corresponding to multiple bandwidths, or deliver large amounts of signals to deliver various services.

In the United States, in an environment where diverse communication services are provided and diverse kinds of communication terminals are supplied, telecommunications operators and landlords are working to provide the best quality service to customers or tenants. Typically, operators try to resolve or improve areas of shade, or low and/or no signal, in buildings. Shaded areas are areas where the communication signals may not be transmitted or otherwise communicated properly.

SUMMARY

Shaded areas or other areas with weak or no signal can generally be removed, for example, by installing base stations and antenna dispersion devices in the shaded area, or by installing one or more Bi-Directional Amplifiers (BDAs) and antenna dispersion devices.

In these circumstances, carriers have a need to provide a lot of data at the same time to provide the best quality services to their customers.

However, where existing installations or older installations are installed, and additional installations are desired, the process may become complicated. The problem of installing a new infrastructure to add to an existing infrastructure, or of installing an infrastructure for an entire combined system as well as installing a further installation infrastructure, may require a considerable amount of time and resources.

Thus, embodiments of the present invention have been proposed to address the above problems, and they aim to provide an integrated antenna distribution system to incorporate a wide range of signals from existing installations, integrating diverse types of communication signals, and transmitting large amounts of Input/Output (I/O) signals to interiors and exteriors of buildings when using existing facilities, or more easily implementing the entire system at a lower cost.

Conventional technology was used by coarse wavelength division multiplexing (CWDM) or dense wavelength division multiplexing (DWDM), for example, with an optic multiplexer in the Head End (HE), or with an optic module with different wavelengths in the Remote Unit (RU). It was a technology that formed a separate link by adding a Transmit/Receive module and an optic cable between the HE and the RU.

However, if an operator wants to add a large number of users onto a same band on existing installed computers, or if a new device or devices are installed without a light cable, for example, due to cost constraints, or if a large amount of multiple Input/Output (I/O) signals need to be sent at the same time, services may need to be provided at low cost, and when only one optical cable is installed in the building.

Furthermore, broadband spectrum bands need to be supported in indoor and outdoor areas, for example, to implement Massive MIMO signals at affordable costs, where existing facilities and resources may be utilized to implement Massive MIMO.

BRIEF DESCRIPTION OF THE DRAWINGS

These and/or other aspects, features, and advantages of the disclosure will become apparent and more readily appreciated from the following description of example embodiments, taken in conjunction with the accompanying drawings, of which:

FIG. 1 is a schematic representation of a configuration of an antenna distributed inside and outside a typical building using a single input/output (I/O) signal, according to an embodiment of the invention.

FIG. 2 is a schematic representation of a configuration of an antenna distributed inside and outside a typical building using a multi I/O signal, according to an embodiment of the invention.

FIG. 13 is a table including the Federal Communications Commission's (FCC's) licensed frequency bands for commercial service.

DETAILED DESCRIPTION

Purposes, features, and benefits of embodiments of the invention will become clearer through the following detailed descriptions relating to the attached drawings. In addition, some details related to embodiments of the invention may be omitted if specific descriptions of those details have been deemed to be unnecessary to understand the described embodiments of the invention. The attached drawings shall further be consulted to provide a more detailed description of various exemplary embodiments according to the invention.

FIG. 1 illustrates a configuration of an antenna distributed inside and outside a typical building utilizing a single I/O signal.

As illustrated in FIG. 1, a distributed antenna system (DAS) can include a head end (HE) (100) connected to base stations (BTS) (2000). The HE 100 is also connected to multiple remote units (RUs) (300) through optic fiber cable, and can be further connected to a tower, which can be installed inside the building.

HE (100) is the main relay unit of the integrated antenna distribution unit. HE (100) receives RF signals from the base station 2000, and transmits the received RF signals to the RU (300) located at a remote location through fiber optical cables. Additionally, HE (100) transmits the RF signals received from the RU (300) to the base station (2000).

FIG. 2 is an example of a configuration capable of transmitting and/or receiving multiple inputs and outputs simultaneously.

The general structure of FIG. 2 is similar to that of FIG. 1. The multiple input multiple output (MIMO) signals are received simultaneously from several base stations (2000), and the HE (110) transmits the MIMO signals to multiple RUs (310) located at a remote area, through fiber optic cables.

Figure 3:
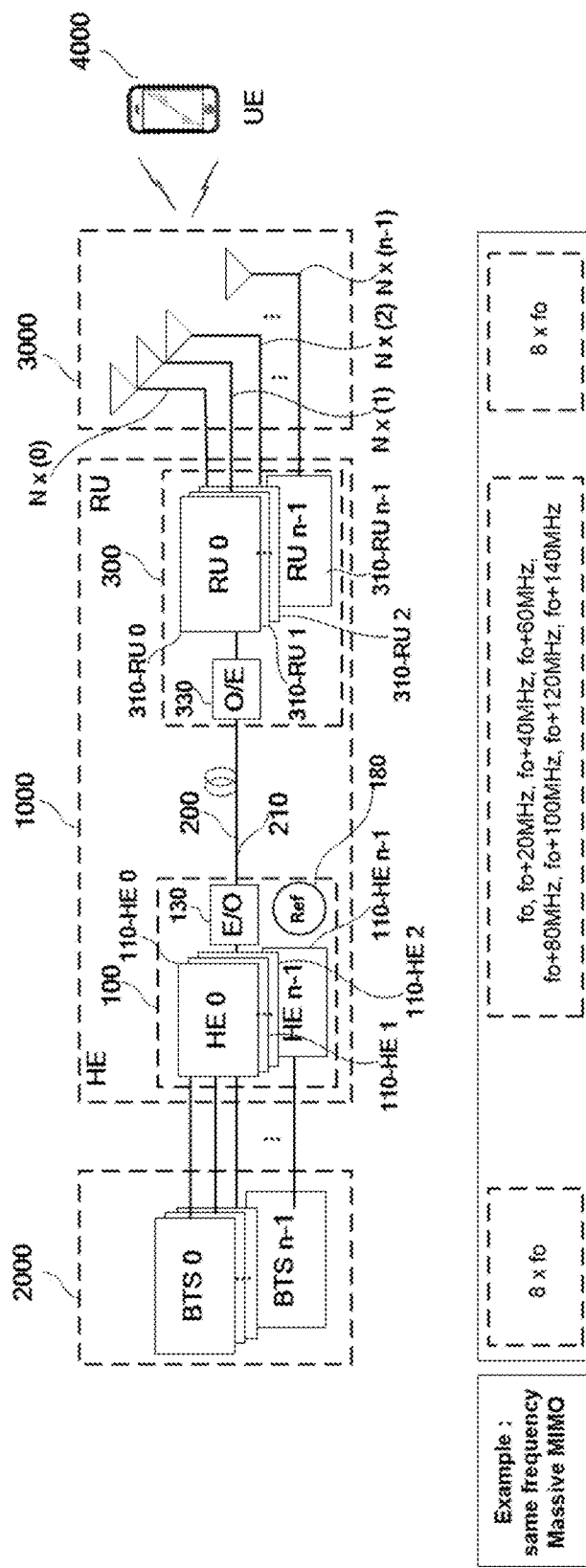
FIG. 3 is an example of a specific configuration of the system of FIG. 1.

FIG. 3 shows a detailed configuration of the antenna distribution system according to the invention of FIG. 1.

FIG. 3 includes an HE (100) with an RF module (110) for adjusting the signals received from the base station 2000, a Frequency Shifter (120) for changing the frequency of the inputted multiple signals randomly, an electrical-to-optical converter (E/O) (130) for converting the inputted electrical signals to optical signals, and a Reference signal generator (180) for generating a reference signal used for frequency stability of the system, for example, when the frequency shifter of the HE (100) and RU (300) changes an arbitrary frequency or frequencies.

Figure 4:
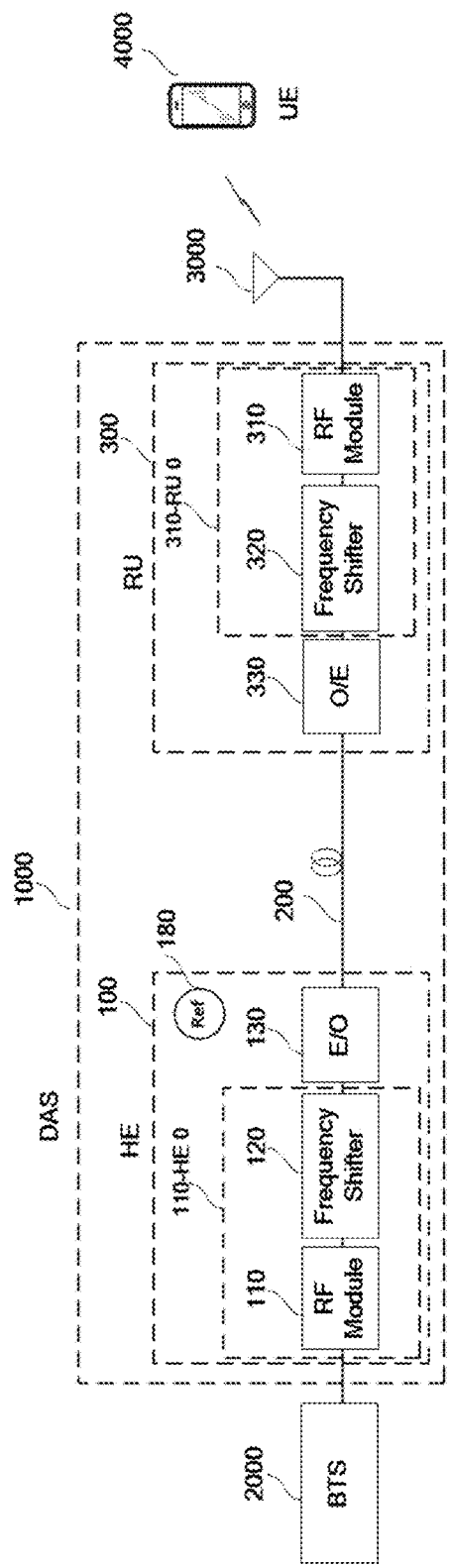
FIG. 4 is an example of a specific configuration of the system of FIG. 2.

When a plurality of signals having the same frequency are received from the base station in FIG. 3, a frequency shifter (120) in each 110-HE module of the HE 100 converts the signals into a predetermined frequency interval unit, and sends the signals through the E/O 130 to the optical-to-electrical converter (O/E) (330) of the remote unit 300 (see, e.g., FIG. 4).

The plurality of signals transmitted at the predetermined frequency intervals are then converted to the original frequency through the respective frequency shifters (320) of the 310-RU of the remote unit. In the RF module (310), the signals are amplified to an appropriate signal size, and are then transmitted to an antenna port 3000.

An example of Massive MIMO for the same frequency occurs where the HE of the DAS receives eight identical frequency signals from the BTS and transmits the signals having the same frequency to each remote unit or remote antenna through, for example, a single fiber or coaxial cable.

As an example of transmitting signals with eight identical frequencies (e.g., frequency fo) from the BTS to distant antennas, each of the frequency shifters (120) located in the 110-HE of the HE (100) can establish an interval of 20 MHz Frequency between signals, converting for example, signals to frequencies fo, fo+20 MHz, fo+40 MHz, fo+60 MHz, fo+80 MHz, fo+100 MHz, fo+120 MHz and fo+140 MHz, before transmitting the signals through the E/O (130) and an optical cable (200) to O/E (330). The transmitted signals can then be converted into their original frequency signals by the frequency shifter (320), and the signals converted into the original frequency signals can then be modulated by the respective RF modules (310) to an appropriate signal amplitude transmitted to each antenna 3000.

In the above example, one fiber optical cable (200) can be replaced with one coaxial cable.

FIG. 4 is an example of a detailed configuration of an antenna distribution system with multiple inputs and outputs as described in FIG. 2.

FIG. 4 shows a specific configuration of an antenna distribution system, where HE (100) includes an RF module (110) for adjusting signals received from the base station, a Frequency Shifter (120) for changing a frequency of the inputted multiple signals randomly, an E/O (130) for converting the inputted electrical signals to optical signals, and a Reference signal generator (180) for generating a reference signal used for frequency stability of the system, for example, when the frequency shifter of the HE (100) and RU (300) changes an arbitrary frequency or frequencies.

In one embodiment, if the RF signal transmitted from the BTS 2000 is a MIMO signal (e.g., 2T×2R, including two transmit and two receive signals), the signals are amplified in the RF module (110) of the HE (100), and while a main DL signal may not be converted in the frequency shifter (120), a sub DL signal may be converted to the sub UL frequency signal. The converted sub UL frequency signal and main DL signal are transmitted to RU (300) in remote locations using E/O (130), the transmitted sub UL frequency signal is then converted to have the frequency of the original sub DL signal via frequency shifter (320). Each of the main DL signal and the sub DL signal is then amplified respectively via the RF module (310) and then sent to user equipment (UE) (4000) via the antenna (3000).

For example, to satisfy the conditions of 8T×8R (e.g., eight transmit signals and eight receive signals, which is a minimum condition for transmission of Massive MIMO) using one fiber optic cable, all DL signals received from BTS (2000) are converted to have the respective appropriate frequencies to avoid interference with each other using frequency shifter (120), and are transmitted to RUs (300) in remote locations using E/O (130), and the converted respective appropriate frequencies are re-converted to the original DL signal frequency, for example, via the frequency shifter (320). Also, the amplified DL signal from RF Module (310) is transmitted via the Massive Antenna (3000).

With the same principle, for UL signals transmitted from the UE (4000) via the antenna (3000), signals inputted to each channel of the RU (300) are amplified by the RF module (310), and each of the signals on each channel is converted to have a respective appropriate frequency to avoid interference with each other, and the signals are then transmitted to E/O (130) of HE (100) through fiber optic cable (200), and thereafter, each of the transmitted signals is re-converted to have their original UL frequency, for example, via frequency shifter (120). In addition, the amplified UL signals from RF Module (110) are sent to BTS (2000).

On the other hand, when 2T×2R, 4T×4R, and 8T×8R MIMO signals were transmitted using one fiber optic cable in a traditional way, the signals had to be sent to remote locations using CWDM or DWDM, or multiplicative fiber optic cables had to be used to send the signals to remote locations.

However, this problem can be resolved by adding frequency shifters (120, 320) in HE (100) and RU (300), without adding deficient fiber optic cables.

Figure 5:
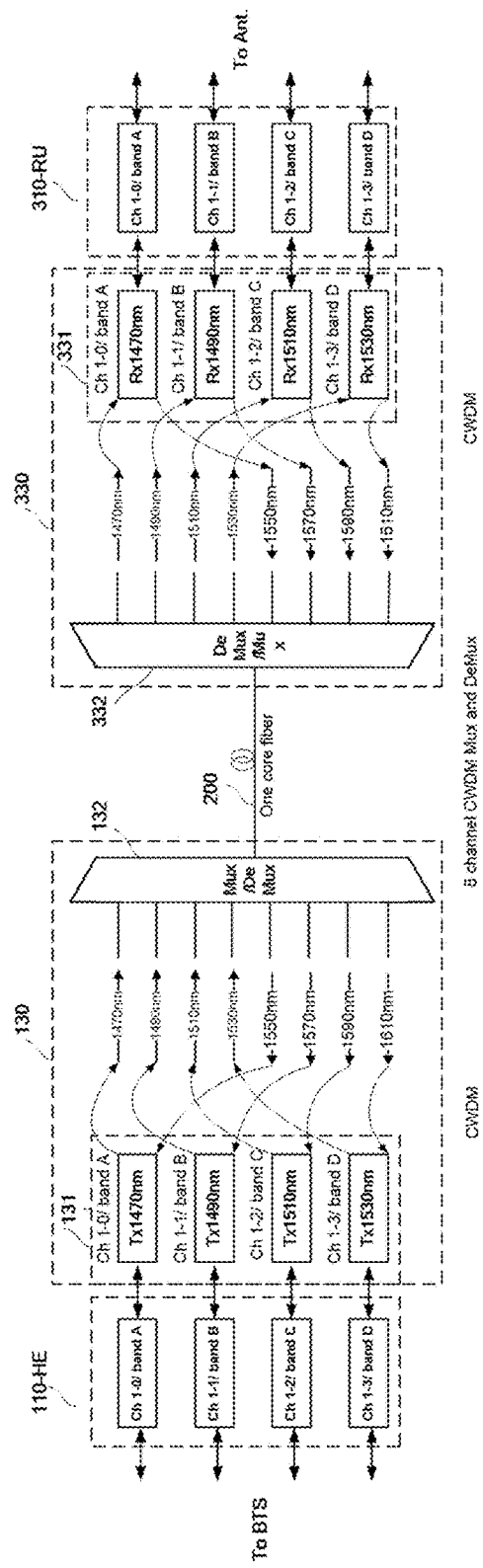
FIG. 5 shows a general configuration of CWDM applied to an optic transceiver of the system of FIG. 2.

FIG. 5 shows an existing method of transferring 4T×4R using 8 channel CWDM.

Figure 6:
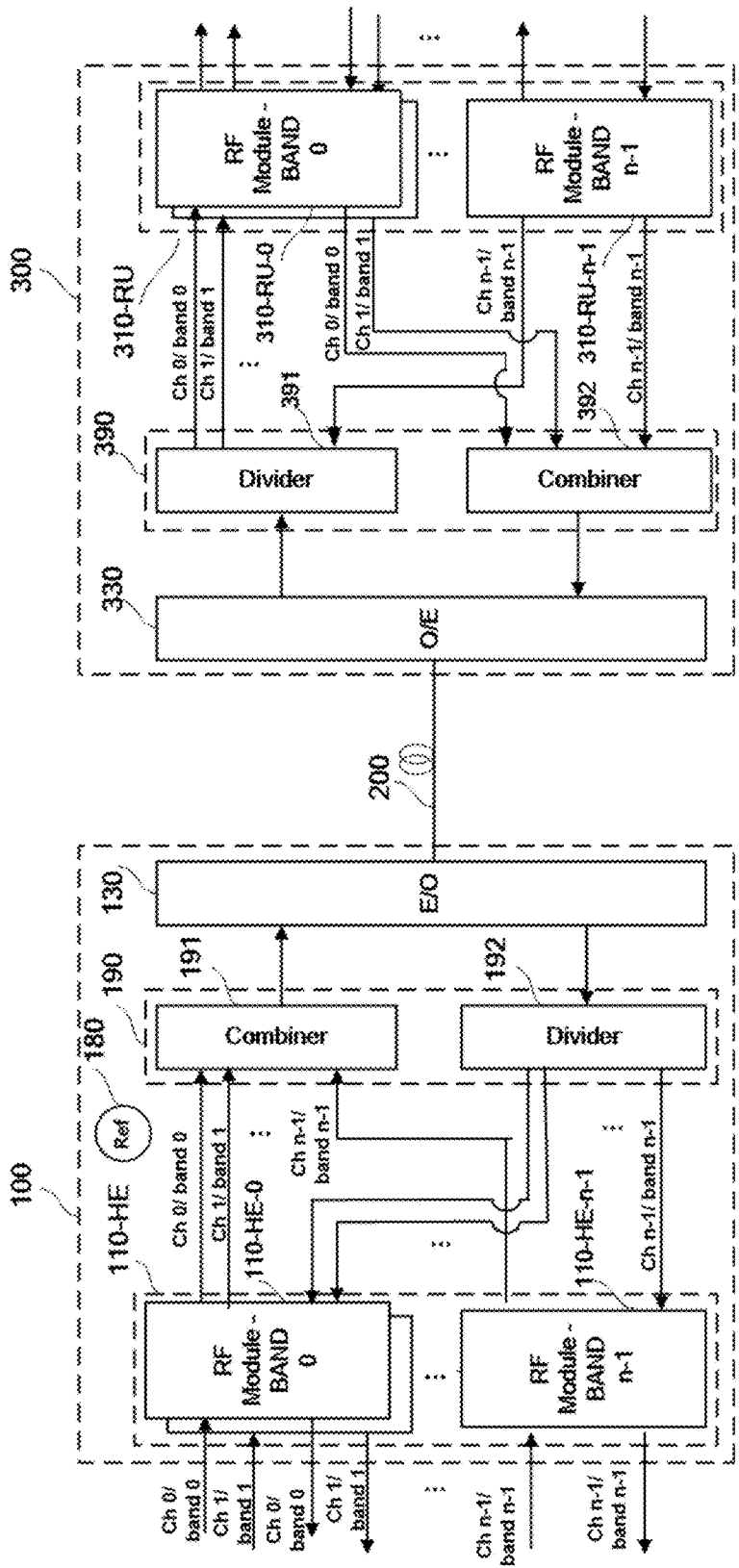
FIG. 6 is an example of a general configuration of the system of FIG. 2.

FIG. 6 illustrates a more detailed view of FIG. 2. Further detailed description or explanation for FIG. 6 is omitted here, since a similar arrangement was already explained with reference to FIG. 4.

Notably, FIG. 6 shows an RF Module (110) and a frequency shifter (120) in one module form.

Figure 7:
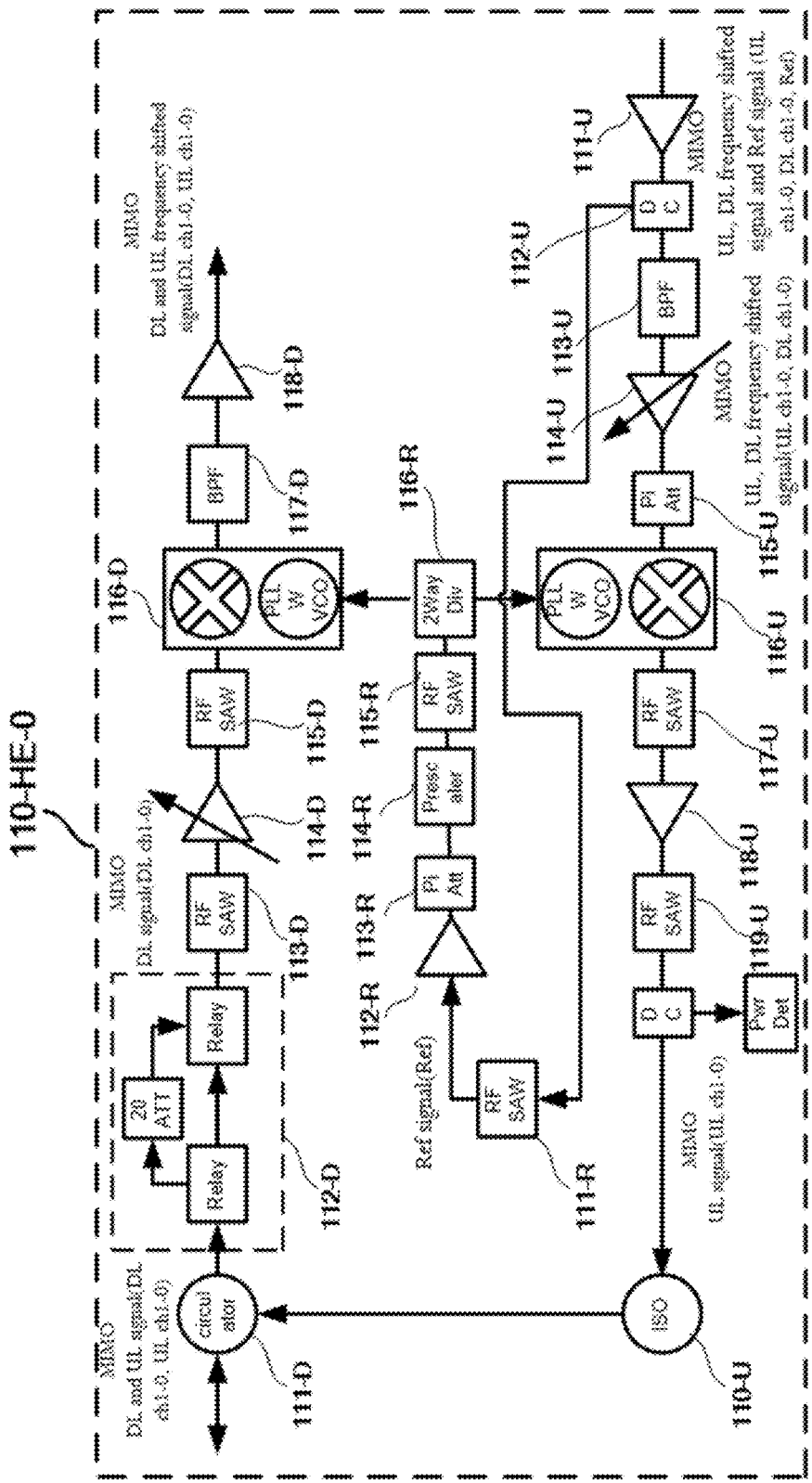
FIG. 7 is an example of a specific configuration of an RF module of a HE and frequency Shifter of the system of FIG. 6.

FIG. 7 is a more detailed block diagram of 110-HE-0 in FIG. 6.

After receiving an RF signal from a duplexer at the BTS 2000, the signal is converted to a proper or desired size by utilizing the amplifier (114-D) and the attenuator (112-D). The resulting DL signal can then be filtered and converted with mixer (116-D) to a UL service frequency band. The DL signal converted into the UL frequency band is then transmitted to the O/E (330) of the Remote Units 300 via the E/O (130).

Meanwhile, along an upload path, a UL signal that was converted into a DL frequency band and transmitted from the O/E (330) of the RU 300 through the E/O (130) can be amplified by the amplifier (111-U), and then converted back into its original UL frequency signal by passing the signal through the band pass filter (113-U) and the frequency mixer (116-U). The signal can then be passed through the band pass filters (117-U) and (119-U), the isolator (110-U), and the circulator (111-D), and then transmitted to the BTS 2000.

A prescaler is a device that generates a slower timer clock by dividing a higher speed clock, in order to solve a problem that generally occurs when a slower timer is needed while using a high-speed clock. For example, if an input clock of 8 MHz is divided by four, the resulting clock becomes 2 MHz.

A reason for using a prescaler or frequency divider in this system is that if all the remote units connected to the HE have the same reference signal and the frequency shifting operation is performed with each phase-locked loop (PLL) in the HE and the remote unit, the frequency can be more accurately restored.

In FIG. 7, a signal inputted through a directional coupler (DC) (112-U) of 110-HE-0 passes a reference signal from a bandpass filter (111-R) through an amplifier (112-R). After amplification, the reference signal is input to the prescaler (114-R), and the input reference signal is divided to an appropriate size. The divided reference signal (e.g., where the frequency of the reference signal is lowered due to the frequency division ratio) is input to the PLL of the frequency mixer (116-D, 116-U).

Figure 8:
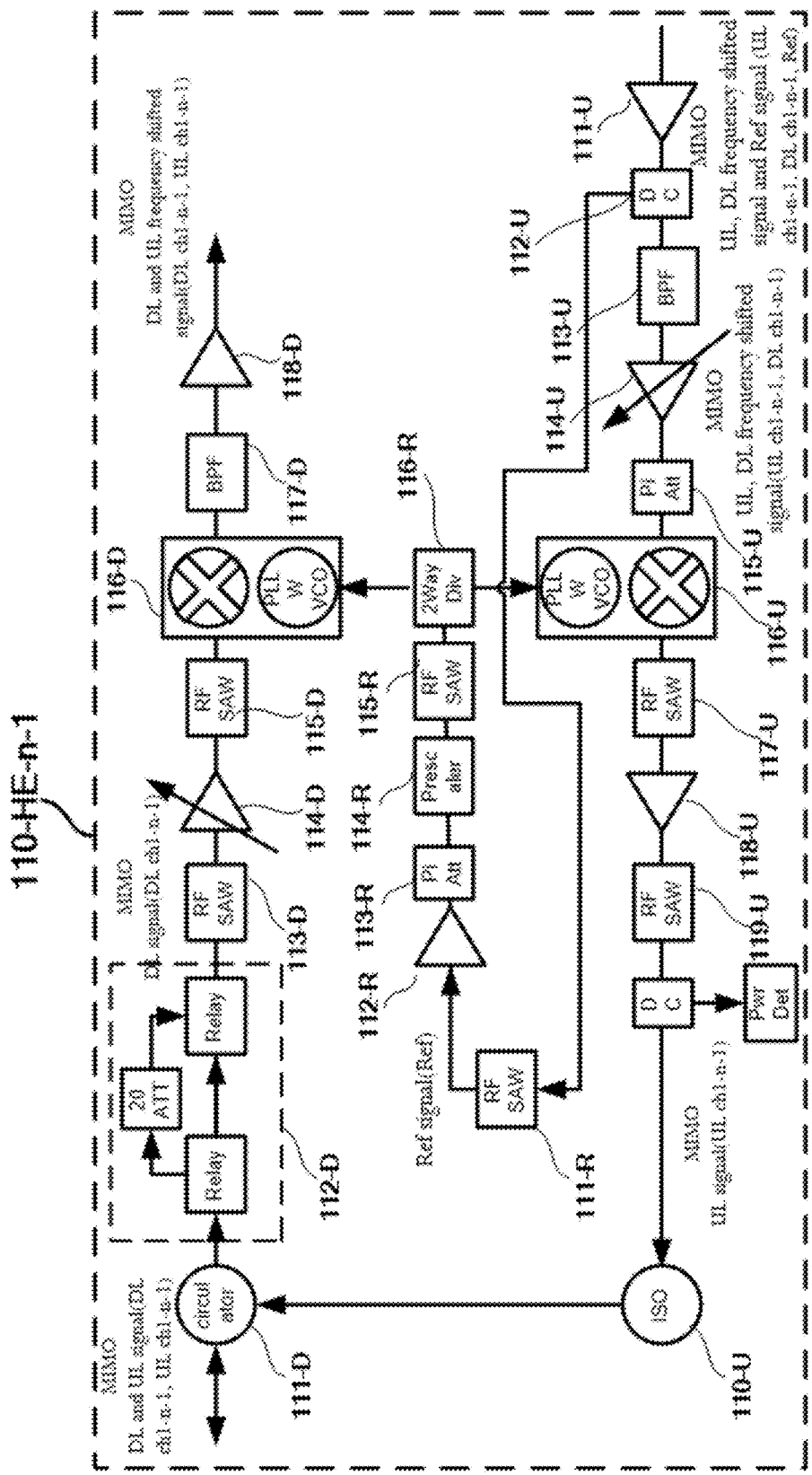
FIG. 8 is an example of a specific configuration of an RF module of the HE and n-1st frequency Shifter of the system of FIG. 6.

FIG. 8 is a detailed diagram of the module (110-HE-n-1) from FIG. 6, that includes an RF Module (110) and a Frequency Shifter (120) of HE (100) in one module. Components previously described with respect to FIG. 4, and the similar components and reference numbers illustrated in FIG. 8 perform the same or similar behavior and functions, and descriptions of those similar functions will not be repeated.

Figure 9:
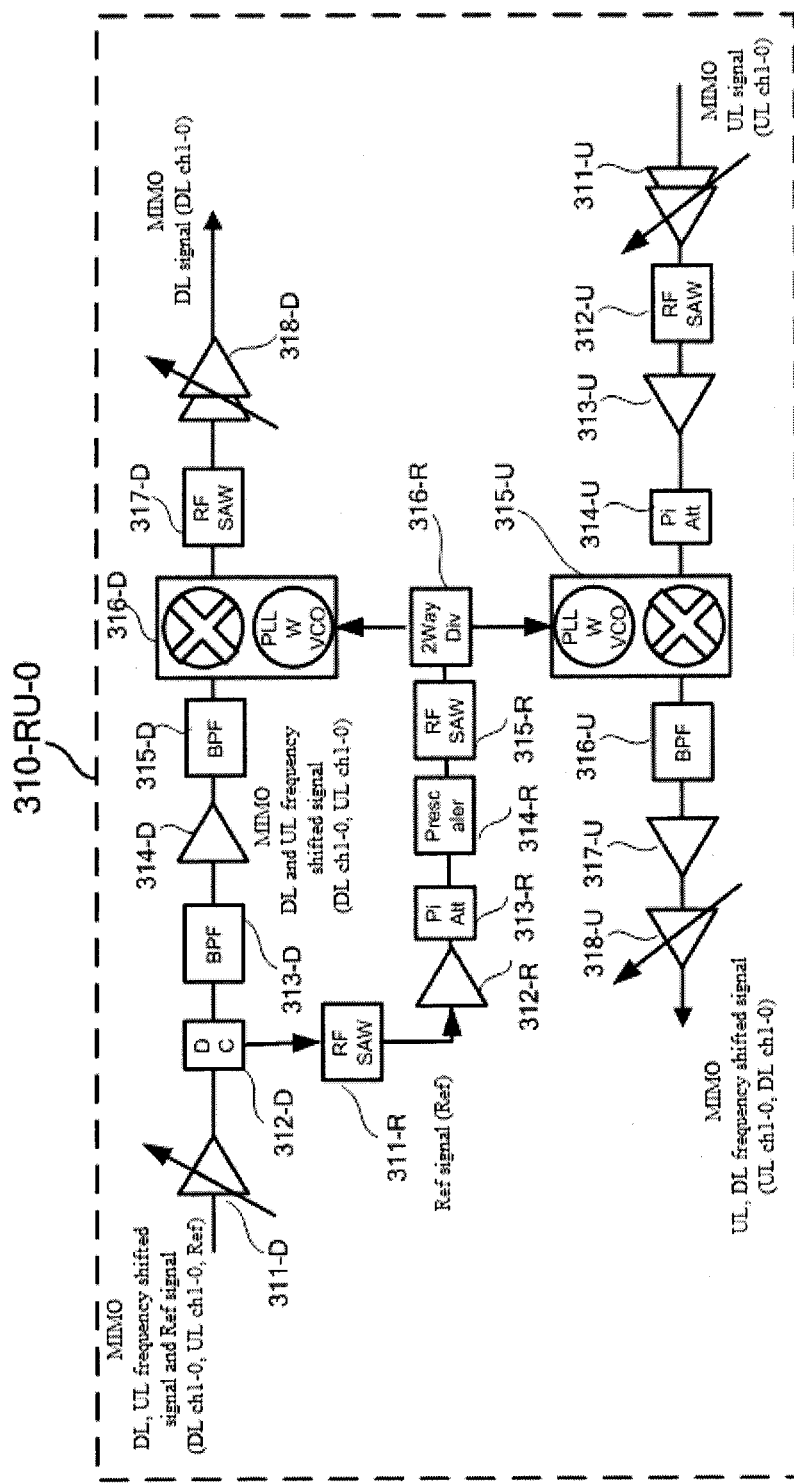
FIG. 9 is an example of a specific configuration of an RF module of a RU and frequency Shifter of the system of FIG. 6.

FIG. 9 is a more detailed block diagram of 310-RU-0 in FIG. 6.

In FIG. 9, a UL signal converted from a DL frequency band is input to the amplifier (311-D), for example, through the E/O (130) of the HE and the O/E (330) of the Remote Units. The signal input to the remote unit (300) includes the UL signal converted from the DL frequency band and the reference signal. The UL signal converted from the DL frequency band passes through band pass filters (313-D) and (315-D), and is converted into an original DL frequency signal using the frequency mixer (316-D, 315-U), amplified to an appropriate size by a variable amplifier (318-D), and then transmitted to the communicating UE (4000) through the antenna (3000).

Along a similar principle, a UL signal input from the antenna (3000) passes through the amplifiers (311-U, 313-U) and the filter (312-U) and is converted into a signal of a proper or desired amplitude. The UL signal is converted into a DL frequency in the frequency mixer (315-U). The UL signal converted into the DL frequency is input to the O/E (330) via the amplifier (317-U) and the filter (316-U), and then transmitted to the E/O (130) of the HE.

In FIG. 9, the reference signal included in the signal input through the directional coupler (DC) (312-D) of 110-RU-0 passes through the bandpass filter (311-R). The reference signal then passes through the amplifier (312-R), the amplified reference signal is input to the prescaler (314-R) after amplification, the input reference signal is divided to an appropriate size, and then the divided reference signal (e.g., where the frequency of the reference signal is lowered due to the frequency division ratio) is input to the PLL of the frequency mixer (316-D, 315-U).

Figure 10:
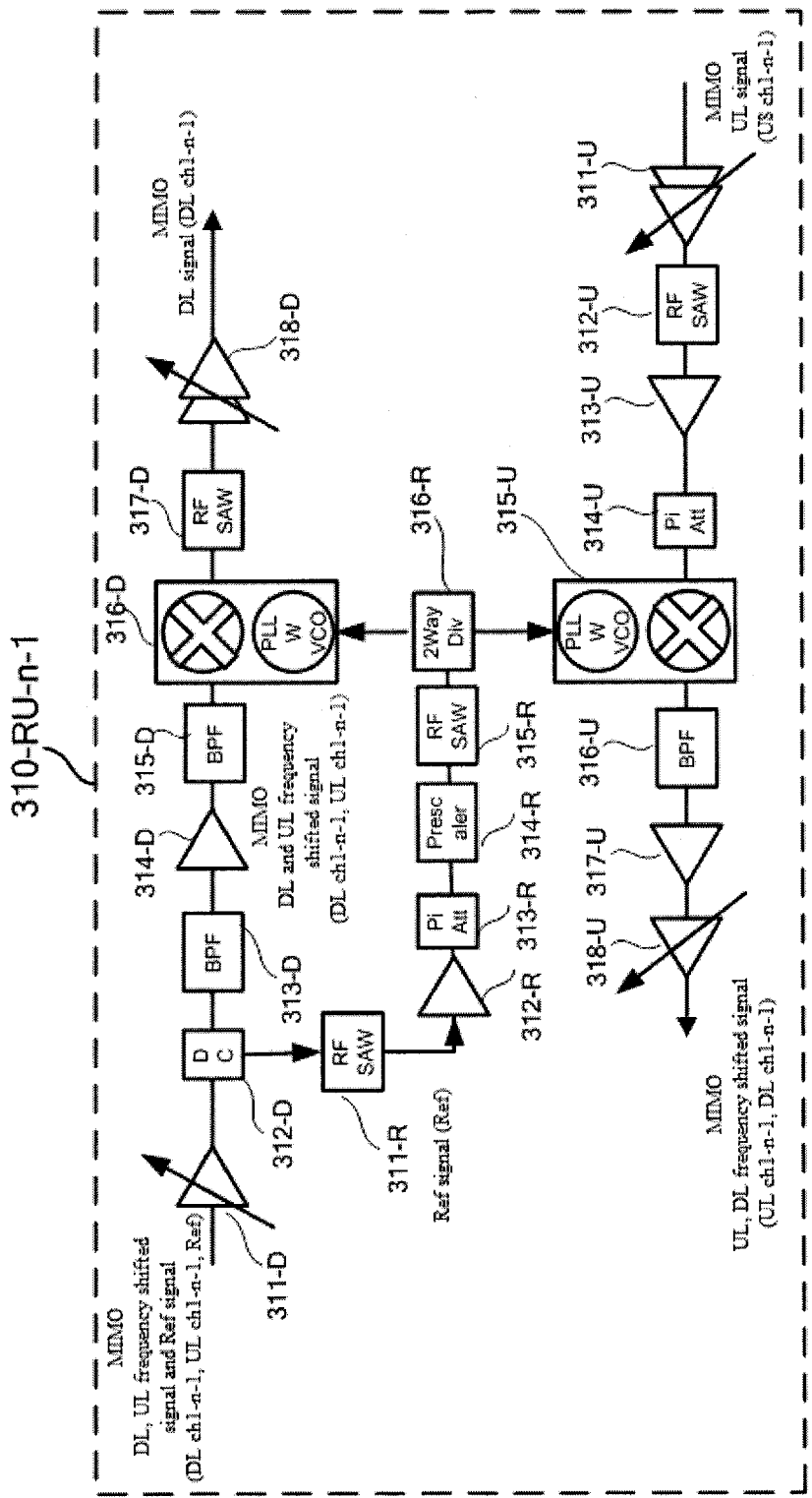
FIG. 10 is an example of a specific configuration of an RF module of the RU and n-1st frequency Shifter of the system of FIG. 6.

FIG. 10 is a detailed diagram of the module (310-RU-n-1) from FIG. 6, that includes the RF module (310) and frequency shifter (320) of the RU (300) in one module. Components that were previously described with respect to FIG. 4 and the similar components and reference numbers illustrated in FIG. 9 perform the same or similar behavior and functions, and descriptions of those similar functions will not be repeated.

FIG. 13 shows the frequency bands for commercial service bands currently licensed by the US FCC. If the DL and UL frequency bands are discontinuous or asymmetrical, a system or configuration may use any one of the assigned frequency bands, and/or use a frequency band not indicated in FIG. 13 (e.g., a frequency band not licensed from the FCC). In this manner, the frequencies of the DL and UL frequency bands can be respectively assigned and used.

For example, FIG. 13 shows frequency bands for commercial service bands licensed by the FCC in the United States and frequency division duplex (FDD) schemes for the commercial 700 MHz band. However, downlink and uplink frequencies here are not consecutively allocated in the frequency band as they are in a typical FDD scheme. The bandwidths of the downlink and the uplink are not symmetrical to each other.

That is, the DL frequency of commercial 700 MHz is 728-757 MHz and the UL frequency band is disjointed, between 698 MHz-716 MHz and 776 MHz-787 MHz.

If only the lower A+B+C region is served in the commercial 700 MHz band, the DL and UL can be exchanged at the FCC authorized frequency in the FDD method.

However, if the lower A+B+C and Upper C regions are all served, one might have to employ a scheme using the frequencies of the DL and UL frequency bands shown, as well as using a frequency band not shown in FIG. 13 (e.g., a frequency band not licensed from the FCC), as shown in the following time division duplex (TDD) scheme.

FIG. 13 shows the frequency bands for commercial service bands currently licensed by the US FCC. Broadband Radio Service Band 2500 MHz (BRS, TDD) and Citizens Broadband Radio Service Band 3.5 GHz (CBRS, TDD) are TDD. For the TDD method, downlink and uplink frequencies are not allocated differently in the frequency band as in the case of the FDD method, but the downlink and uplink signals are transmitted in the same frequency band by dividing the entire band into time slots.

For this reason, in the present invention, in some of the frequency bands permitted by the FCC, the DL frequency signals cannot be converted into UL frequencies and the UL frequency signals into DL frequencies in the TDD frequency bands as they are in the FDD method.

Therefore, the TDD scheme uses frequencies for the DL and UL frequency bands using other frequency bands (e.g., frequency bands not licensed from the FCC) that are not shown in FIG. 13.

As an example of the TDD scheme, Band 2500 MHz (BRS, TDD) is shown in FIG. 13, and the total allocated frequency band is 194 MHz.

Assuming that this frequency is used as a whole, the description will be made with reference to the frequency band of 1300 MHz, which is not shown in FIG. 13. Under such an example, the DL frequency signals may be used or allocated between 1400 MHz and 1600 MHz, while the UL frequency band may be between 1100 MHz and 1300 MHz.

Figure 11:
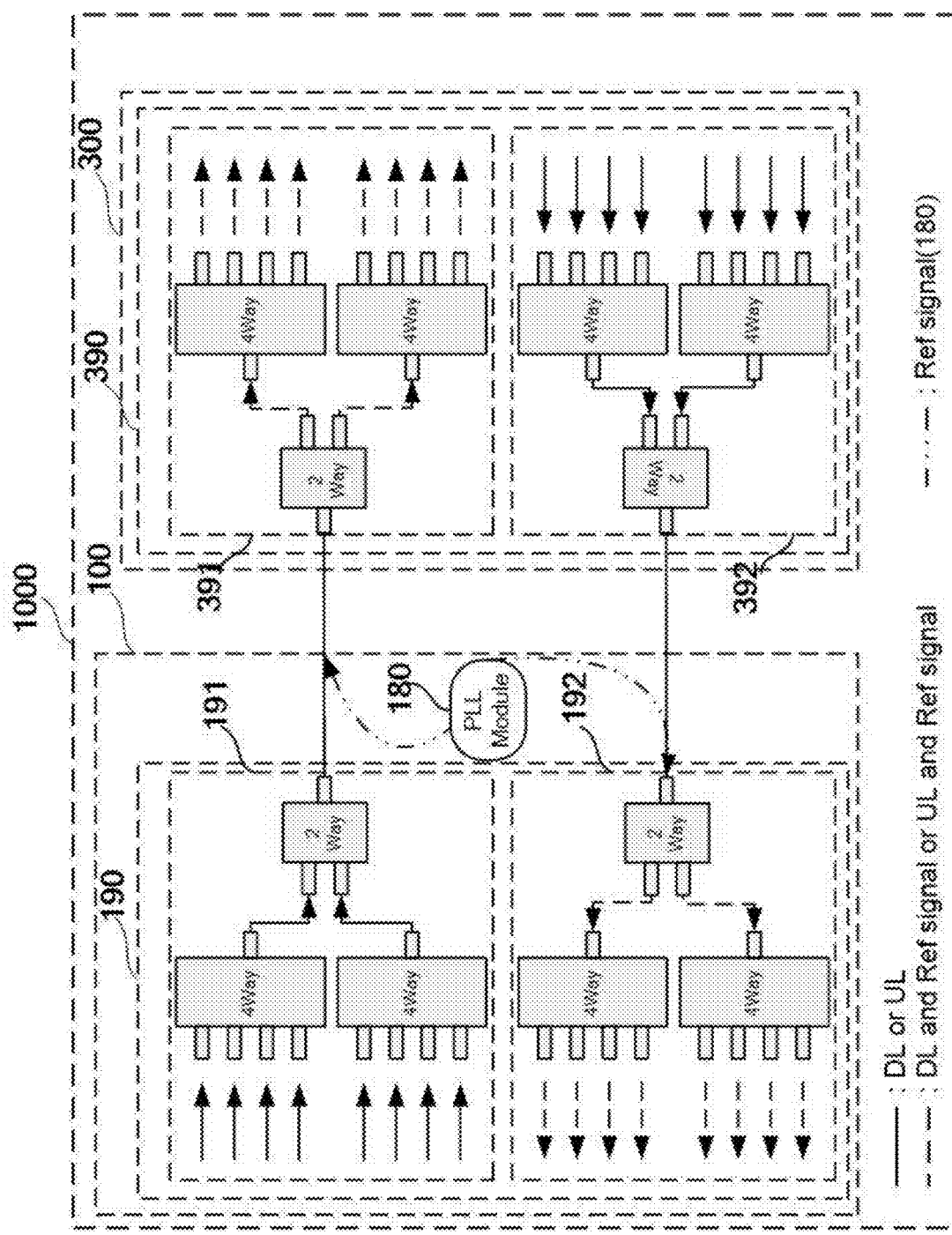
FIG. 11 shows a composition of reference signals of FIG. 6 and FIG. 2.

FIG. 11 shows a reference signal generator (180), a combiner (191), and a divider (192) in HE (100), and a divider (391) and a combiner (392) in RU (300).

Additionally, the reference signal generator (180) is located in HE, and the reference signal from the reference signal generator (180) is supplied to the divider (192) of HE (100) via the coaxial cable, and the reference signal (180) is supplied by the coaxial and optical cables to the divider (391) of RU (300).

The reference signal generator (180) of the HE can use a single reference signal in a multi-band spectrum when the HE is connected to the plurality of RUs.

Figure 12:
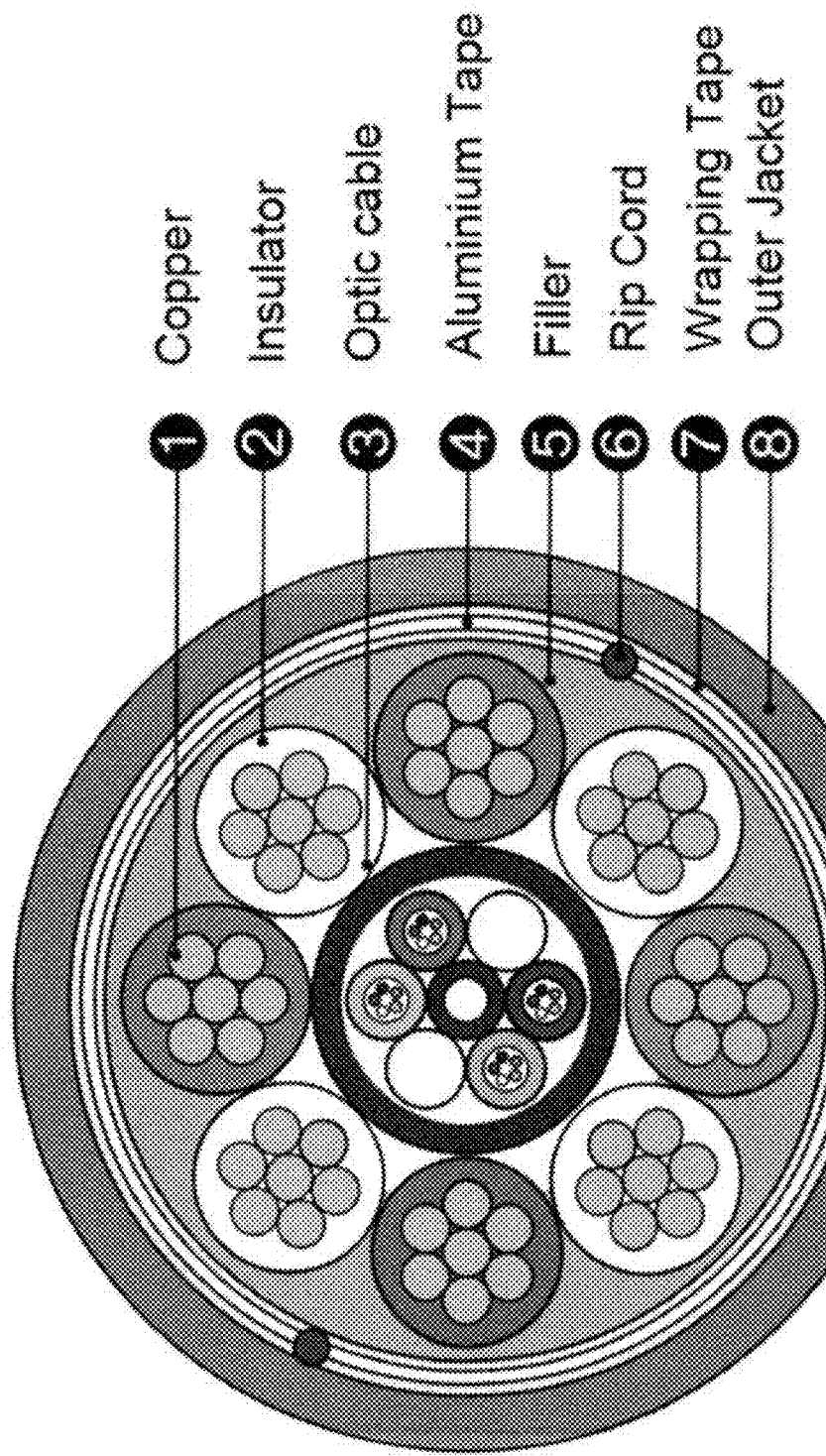
FIG. 12 is a general configuration of a general Hybrid Fiber Coaxial Cable.

FIG. 12 is a general drawing of a Hybrid Fiber Coaxial Cable with a conventional core.

In the case of a massive MIMO that transfers from multi-band in FIG. 2, FIG. 3, and FIG. 6, one HFC cable, such as the one shown in FIG. 12, can serve, for example, up to 256Tx256R.

By broadcasting various types of communication signals, for example, to shaded areas through a single, integrated relay system, embodiments of the invention reduce installation costs and equipment manufacturing costs, compared for example, to those costs generated by installing the various relays separately for each communication service. Also, this invention is effective in preventing damage to buildings by installing one integrated relay system in a building, etc., rather than having to separately install multiple separate relay systems. Using existing installations, a large number of inputs and outputs of 4th generation and 5th generation communications can be transmitted simultaneously to reduce facility investment costs and installation costs.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. A Distributed Antenna System (DAS) for massive MIMO signals, the DAS comprising:
   a Head End (HE) configured to receive RF signals from a base station, wherein the HE comprises a frequency shifter configured to convert respective frequencies of the signals; and
   a plurality of Remote Units (RUs) each respectively connected to the HE over a single fiber optic cable, wherein each of the RUs comprises a frequency shifter configured to convert respective frequencies of signals received by the RU;
   wherein the frequency shifter of the HE is configured to convert a downlink (DL) signal having a frequency in a DL frequency spectrum to a signal having a frequency in an Uplink (UL) frequency band when the HE transmits the DL signal to the RUs in a multi-band spectrum, and the frequency shifter of each of the RUs is configured to convert a UL signal having a frequency in a UL frequency spectrum to a signal having a frequency in a DL frequency band when the RU transmits the UL signal to the HE in a UL frequency spectrum.

2. The DAS of claim 1, wherein the HE is configured to receive massive MIMO signals from the base station, and the frequency shifter of the HE is configured to convert an original frequency of the received massive MIMO signals to one or more converted frequencies for transmitting the massive MIMO signals to one or more of the RUs.

3. The DAS of claim 2, wherein the frequency shifter of the HE is further configured to transmit the massive MIMO signals with the converted frequencies to the one or more of the RUs.

4. The DAS of claim 2, wherein the frequency shifter of the one or more of the RUs is configured to re-convert the one or more converted frequencies of the massive MIMO signals transmitted from the HE back to the original frequency of the received massive MIMO signals.

5. The DAS of claim 1, wherein the HE further comprises an RF module for adjusting the RF signals received from the base station.

6. The DAS of claim 5, wherein the RF module and the frequency shifter of the HE are formed in a single module in the HE.

7. The DAS of claim 1, wherein the HE further comprises a reference signal generator for generating a reference signal, and wherein the reference signal generator is configured to use a single reference signal in a multi-band spectrum when the HE is connected to the plurality of RUs.

8. The DAS of claim 7, wherein the HE and the each of RUs each comprises a prescaler or a frequency divider for matching a reference frequency of the RU to a frequency of the reference signal.

9. The DAS of claim 1, wherein when at least one of respective frequency bandwidths of the DL frequency band and the UL frequency band is discontinuous and/or asymmetric, the frequency shifter of the HE or the frequency shifter of the RUs is configured to use a band or frequency where harmonics do not occur or are less significant for a multi-bandwidth spectrum.

10. The DAS of claim 9, wherein when an available frequency band is a broad bandwidth and when time division duplex (TDD) is used, the frequency shifter of the HE is configured to convert the DL signal from a currently used frequency band to the available frequency band.

11. The DAS of claim 10, wherein when the frequency shifter of the HE converts the DL signal from the currently used frequency band to the available frequency band and the HE transmits the converted signal to the RU, the RU is configured to restore the converted signal from the available frequency band back to the currently used frequency band.

12. The DAS of claim 11, wherein when a large amount of signals at a same frequency are to be transmitted, a frequency of the signals is dropped by a frequency that does not cause interference, and the signals are transmitted to the RU using one of fiber optic cable or copper cable.

13. The DAS of claim 9, wherein when a large amount of signals at a same frequency are to be transmitted, a frequency of the signals is dropped by a frequency that does not cause interference, and the signals are transmitted to the RU using one of fiber optic cable or copper cable.

14. The DAS of claim 1, wherein when a large amount of signals at a same frequency are to be transmitted, a frequency of the signals is dropped by a frequency that does not cause interference, and the signals are transmitted to the RU using one of fiber optic cable or copper cable.

* * * * *